United States Patent [19]

Maehara

[11] Patent Number: 4,884,492
[45] Date of Patent: Dec. 5, 1989

[54] HYDRAULIC POWER BOOSTER

[75] Inventor: Toshifumi Maehara, Hanazono, Japan

[73] Assignees: Akebono Brake Industry Co., Ltd., Tokyo; Akebono Research and Development Centre Ltd, Saitama, both of Japan

[21] Appl. No.: 213,127

[22] Filed: Jun. 29, 1988

[30] Foreign Application Priority Data

Jul. 13, 1987 [JP] Japan .................. 62-174265

[51] Int. Cl.$^4$ .............................. F15B 9/10
[52] U.S. Cl. .................. 91/370; 91/376 R; 91/382; 60/547.1
[58] Field of Search ............. 91/370, 374, 376 R, 91/382; 60/547.1 R

[56] References Cited

U.S. PATENT DOCUMENTS

| 2,928,378 | 3/1960 | Leduc | 91/376 R X |
| 3,628,423 | 12/1971 | Dymond | 91/376 R |
| 3,707,112 | 12/1972 | Ewald | 91/376 R |
| 3,707,880 | 1/1973 | Bach | 91/376 R X |
| 3,747,473 | 7/1973 | Bach et al. | 91/376 R X |
| 3,815,364 | 6/1974 | Belart et al. | 91/376 R X |
| 4,642,990 | 2/1987 | Mizusawa et al. | 91/376 R X |

Primary Examiner—Robert E. Garrett
Assistant Examiner—Mark A. Williamson
Attorney, Agent, or Firm—Oliff & Berridge

[57] ABSTRACT

A hydraulic booster includes a power piston which is inserted slidably into a cylinder member and has a tip portion which is coupled to a piston of a master cylinder, a pressure chamber disposed in the rear of the power piston, a return valve provided in such a manner as to open and close a channel for connecting the pressure chamber to a reservoir, and a supply valve disposed in such a manner as to connect the pressure chamber to a high-pressure fluid source, a high-pressure fluid being introduced into the pressure chamber as the return valve is closed and the supply valve is opened. A valve sleeve is slidably inserted in the power piston and is urged rearwardly of the power piston by a spring, and a cam portion provided in the valve sleeve is employed to open and close the supply valve.

12 Claims, 3 Drawing Sheets

HYDRAULIC POWER BOOSTER

BACKGROUND OF THE INVENTION

The present invention relates to a hydraulic booster for a fluid brake.

Hitherto, hydraulic boosters for fluid brakes are known through, for instance, U.S. Pat. Nos. 3,747,473 and 3,815,364.

The hydraulic booster disclosed in U.S. Pat. No. 3,747,473 is illustrated in FIG. 3. In the normal state shown in FIG. 3, this apparatus is arranged such that a piston of a master cylinder (not shown) is coupled to a power piston 10 by means of a coupling member 85, a ball valve 83 abuts against a valve seat 84 to close a high-pressure channel 11 connected to a high-pressure fluid source (not shown) through a high-pressure port 86. In addition, an inner member 81 is separated from the ball valve 83, and a channel 16 connects a pressure chamber 45 to a low-pressure port 80, so that the pressure chamber 45 is in an unpressurized state.

Subsequently, if a push-rod 37 is pushed, a tip of the inner member 81 is brought into contact with the ball valve 83, thereby closing the channel 16 connecting the pressure chamber 45 to the low-pressure port 80. If the inner member 81 is further pushed, the ball valve 83 is separated from the valve seat 84, which in turn causes the high-pressure channel 11 to open, thereby allowing the pressure chamber 45 to be communicated with the high-pressure fluid source.

The high-pressure fluid which has flowed into the pressure chamber 45 then pushes the power piston 10 leftwardly, as viewed in the drawing, which in turn causes the piston of the master cylinder (not shown) to advance via the coupling member 85, thereby feeding the fluid contained in the master cylinder into a wheel cylinder.

Simultaneously, since the high-pressure fluid in the pressure chamber 45 pushes an outer member 82 rightwardly, as viewed in the drawing, the push-rod 37 transmits a pressure proportional to the hydraulic pressure within the pressure chamber 45 to the operator.

The hydraulic booster disclosed in U.S. Pat. No. 3,815,364 is arranged such that, in the same way as the apparatus shown in FIG. 3, a high-pressure fluid from a high-pressure fluid source is introduced into a pressure chamber to press a power piston so as to press a piston in a master cylinder. Specifically, a high-pressure channel for communicating the pressure chamber and the high-pressure fluid source and a channel for communicating the pressure chamber and a low-pressure port are opened and closed by a spool valve, so that this apparatus is capable of transmitting a pressure proportional to the hydraulic pressure in the pressure chamber to the operator.

The conventional apparatus shown in FIG. 3 and disclosed in U.S. Pat. No. 3,747,473 is compact as compared with a booster of a type which makes use of the pressure differential of the air, and can be conveniently used since a reactionary force proportional to the pressing force of the piston can be transmitted in the same way as the booster which makes use of the pressure differential of the air.

However, in the conventional apparatus shown in FIG. 3, the valve seat 84 for opening and closing the high-pressure channel 11 is pushed directly in the sliding direction of the inner member 81, and the sliding speed of the inner member 81 and the moving speed of the ball valve are set to be equal. Consequently, the internal pressure of the pressure chamber 45 rises suddenly.

In addition, since the internal pressure of the pressure chamber 45 rises suddenly, the reactionary force which is transmitted to the push-rod 37 also increases sharply. Consequently, the advancing speed of the push-rod 37 declines, and the rise in the hydraulic pressure in the pressure chamber 45 becomes dull. Hence, the hydraulic pressure in the pressure chamber 45 is subjected to a change in the form of broken lines, and the hydraulic pressure continues to be affected by that change, so that the hydraulic pressure changes in steps, thereby making it impossible to perform a smooth braking operation.

In addition, since the hydraulic booster disclosed in U.S. Pat. No. 3,815,364 employs a spool valve, precision machining of fitting portions of said spool valve is required, and there are cases where leakage of the liquid occurs if a gap of said fitting portions changes due to a change in the temperature of the liquid.

SUMMARY OF THE INVENTION

Accordingly, an object of the present invention is to provide a hydraulic booster for a fluid brake which is free from susceptibility to leakage and can be made compact, operate smoothly and be manufactured at low cost without requiring high-precision machining, thereby overcoming the above-described drawbacks of the prior art.

To this end, according to the present invention, there is provided a hydraulic booster having a power piston which is slidably inserted into a cylinder member and is coupled to a piston of a master cylinder, a pressure chamber disposed in the rear of the power piston, a return valve provided in such a manner as to open and close a low pressure channel for connecting the pressure chamber to a reservoir, and a supply valve disposed in such a manner as to open and close a high-pressure channel for connecting connect the pressure chamber to a high-pressure fluid source, a high-pressure fluid being introduced into the pressure chamber as the return valve is closed and the supply valve is opened, the hydraulic booster comprising: a valve sleeve slidably inserted in the power piston and urged to the rearward of the power piston by a first spring; a cam portion provided on the valve sleeve and adapted to open the high-pressure channel by pressing the supply valve when the valve sleeve is advanced, wherein the supply valve is constituted by a first ball urged by a second spring in such a manner as to close the high-pressure channel the cam portion is provided in an outer periphery of the valve sleeve; and the high pressure channel consists of the gap between the power piston and the outer periphery of the valve sleeve.

In the hydraulic booster according to the present invention, since the supply valve is opened by the cam portion, the hydraulic pressure of the pressure chamber rises in the form of a continuous straight line without rising in steps.

The above and other objects, features and advantages of the present invention will become more apparent from the following detailed description of the invention when read in conjunction with the accompanying drawings.

DESCRIPTION OF THE PREFERRED EMBODIMENTS

Figure 1:
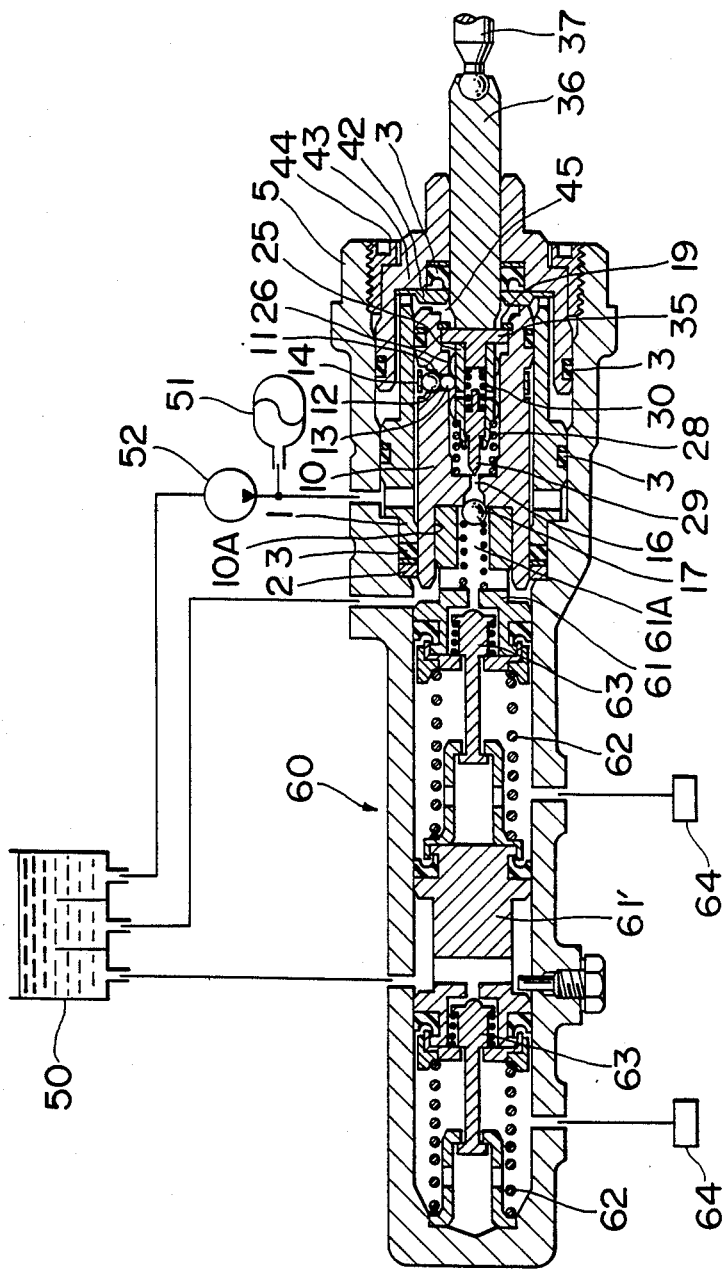
FIG. 1 is a cross-sectional view of a hydraulic booster in accordance with an embodiment of the present invention.

FIG. 1 illustrates a hydraulic booster in accordance with an embodiment of the present invention. In the drawing, a fixed ring 2 and a cylinder 1 are inserted in an outer sheath 5 integral with a master cylinder 60, and a cylinder end portion member 43 is fitted thereinto via an abutting member 42 from the rearward of the cylinder 1 and is secured by a threaded ring 44 from the outside.

A power piston 10 is inserted slidably in the cylinder 1, and a pressure chamber 45 is formed between the rear of the power piston 10 and an end portion of the cylinder 1.

A master piston 61 of a master cylinder 60 is connected to a tip portion of the power piston 10 at a recessed portion 10A thereof, and a valve sleeve 25 urged by a return spring (first spring) 28 is slidably inserted in the power piston 10.

A return valve 29 urged by an urging spring 30 is provided at a tip portion of the valve sleeve 25, and this return valve 29 is capable of opening and closing a low pressure channel 16 for connecting the pressure chamber 45 to a reservoir 50. This low pressure channel 16 connects the reservoir 50 to the pressure chamber 45 via a gap formed between the power piston 10 and the valve sleeve 25 and through a passage 61A provided in the master piston 61. The passage 61A in the master piston 61 is provided with a check valve 17.

In addition, a supply valve 12 which is capable of opening and closing a high-pressure channel 11 connecting the pressure chamber 45 to the high-pressure fluid source (accumulator) 51 is provided in the power piston 10. This high-pressure channel 11 is adapted to connect the pressure chamber 45 to the high-pressure fluid source (accumulator) 51 via a gap between the power piston 10 and the valve sleeve 25 and a gap between the cylinder 1 and the power piston 10.

The high-pressure fluid source (accumulator) 51 is connected to a pump 52, which is connected to the reservoir 50. The supply valve 12 is constituted by a first ball and is pressed by an annular leaf spring (second spring) 14 surrounding an outer periphery of the power piston 10, and is thus brought into contact with a cam 26 of the valve sleeve 25 via a ball (second ball) 13, thereby preventing any rattling during the running of a vehicle. The cam 26 provided in the valve sleeve 25 is formed in such a manner that, as it slides along the valve sleeve 25, a slanting surface of the cam 26 smoothly pushes open the supply valve 12 via the ball 13.

A stopper 35 is installed on a rear surface of the valve sleeve 25 facing the pressure chamber 45, and is pressed by a stopper receiving member 19 provided on the power piston 10. Thus the sliding range of the valve sleeve 5 is restricted by the stopper 35 and the stopper receiving member 19. In addition, a front end portion of a reaction piston 36 abuts against the rear surface of the valve sleeve 25 via the stopper 35. This reaction piston 36 is provided slidably, and a push-rod 37 provided outside the cylinder 1 is connected thereto.

The arrangement is such that as the valve sleeve 25 advances, the low pressure channel 16 is first closed, and the supply valve 12 is then opened. Members provided at joint portions of various parts and denoted by reference numeral 3 are seal rings.

The portion which is shown as a tandem-type master cylinder 60 has a known structure, and is provided with a primary piston (master piston) 61, a secondary piston 61', a controlling spring 62, and a valve 63 so as to feed a pressurized liquid to a wheel cylinder 64.

A description of the operation will now be described.

FIG. 1 illustrates the hydraulic booster in an unoperative state in which the push-rod 37 has been returned to the right-hand side, as viewed in the drawing. In this state, the high-pressure channel 11 connecting the pressure chamber 45 to the high-pressure fluid source (accumulator) 51 is closed by the supply valve 12, the return valve 29 of the low pressure channel 16 connecting the pressure chamber 45 to the reservoir 50 is opened, so that the pressure chamber 45 communicates with the reservoir 50.

In this state, if the push-rod 37 is advanced leftwardly, as viewed in the drawing, by a brake pedal (not shown), the reaction piston 36 advances, which in turn causes the valve sleeve 25 to advance, and the return valve 29 closes the low pressure channel 16 connecting the pressure chamber 45 to the reservoir 50.

If the push-rod 37 is further advanced, the cam 26 of the valve sleeve 25 pushes open the supply valve 12, thereby opening the high-pressure channel 11 for connecting the pressure chamber 45 to the high-pressure fluid source 51. Thus the high-pressure fluid flows into the pressure chamber 45 from the high-pressure fluid source 51 via the passage between the cylinder 1 and the power piston 10, an outer periphery of the supply valve 12, and a side portion of the cam 26 of the valve sleeve 25.

Subsequently, since the supply valve 12 is pushed open by the cam 26, and is hence gradually opened by the slanting surface of the cam 26, the internal pressure of the pressure chamber 45 increases continuously. Accordingly, the power piston 10 is pushed leftwardly, as viewed in the drawing, by a force proportional to the diameter thereof and the hydraulic pressure of the pressure chamber 45, so that the master piston 61 of the master cylinder 60 is further advanced to feed the pressurized fluid in the master cylinder 60 to the wheel cylinder 64.

At the same time, the hydraulic pressure of the pressure chamber 45 acts on the reaction piston 36 as a reactionary force of a magnitude which is proportional to the diameter of the reaction piston 36 and the hydraulic pressure of the pressure chamber 45. Subsequently, when pressing of the brake pedal is canceled to release the pressing force of the push-rod 37, the valve sleeve 25 is returned by the action of the return spring 28, which in turn causes the supply valve 12 to close the high-pressure channel 11. The return valve 29 then opens the channel 16, while the power piston 10 returns in conjunction with the return of the master piston 61 inside the master cylinder 60, the fluid in the pressure chamber 45 passes through the low pressure channel 16 and further through the check valve 17 to return into the reservoir 50.

Figure 2:
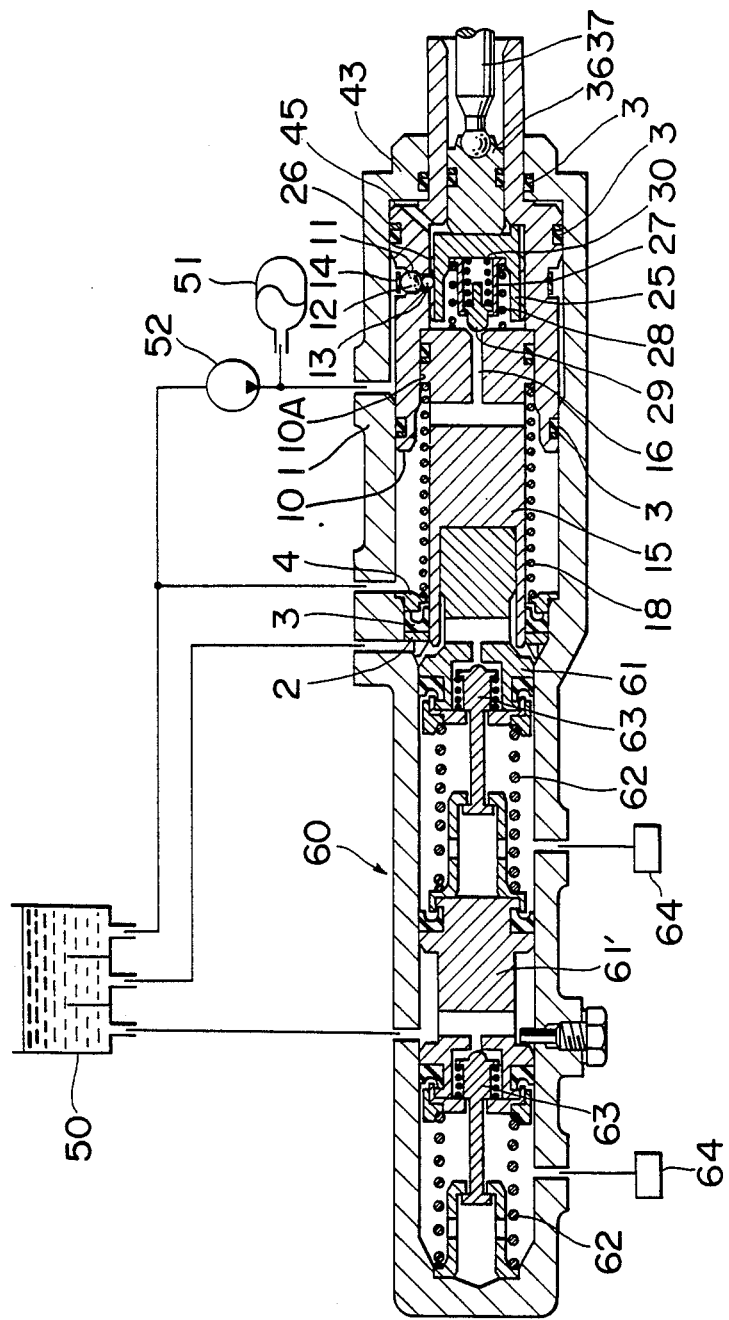
FIG. 2 is a cross-sectional view of the hydraulic booster in accordance with another embodiment of the present invention.
Figure 3:
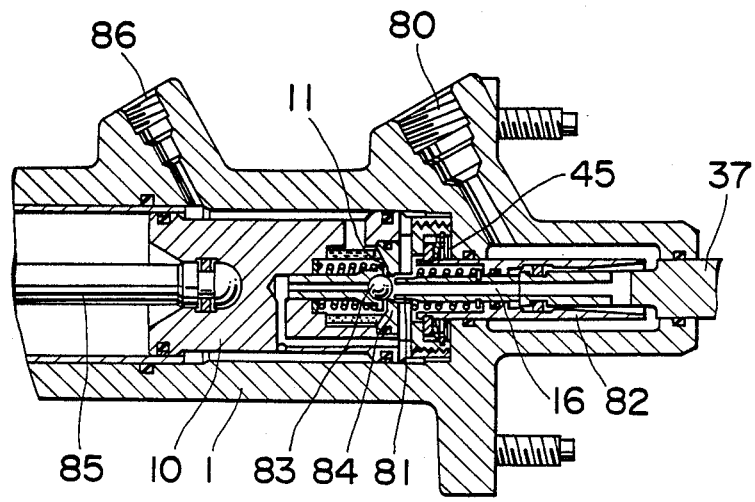
FIG. 3 is a cross-sectional view of a conventional hydraulic booster.

FIG. 2 shows the hydraulic booster in accordance with another embodiment of the present invention, and the same parts as those of the embodiment illustrated in FIG. 1 are denoted by the same reference numerals, and a description thereof will be omitted.

In this embodiment, the outer sheath connecting with the master cylinder 60 is denoted by numeral 1, while a joint portion connecting the cylinder end portion member 43 to the cylinder 1 is omitted in FIG. 2.

The master piston 61 engages with the power piston 10 via the piston receiving member 15, the power piston 10 is urged at one end thereof by a return spring (third spring) 18 abutting against an abutting ring 4 o as to assist the return spring 62 of the master cylinder 60. The check valve 17 is eliminated from the low pressure channel 16 for connecting the pressure chamber 45 to the reservoir 50, and a portion for retaining the return valve 29 of the valve sleeve 25 is formed as a valve retaining cylinder 27 separately from the valve sleeve 25.

It should be noted that the operation of the apparatus shown in FIG. 2 is the same as that of the apparatus shown in FIG. 1 except that the fluid inside the pressure chamber 45 passes through the low pressure channel 16 without passing through the check valve 17 and is hence directly returned to the reservoir 50.

In accordance with the present invention, the supply valve 12 for opening and closing the high-pressure channel 11 is formed separately from the return valve 29, and is adapted to be opened by the cam 26. Therefore, when the supply valve 12 is opened, the hydraulic pressure of the pressure chamber 45 rises in the form of a continuous straight line without rising in steps, so that the hydraulic booster operates smoothly, and the reactionary force transmitted to the operator via the pushrod 37 also becomes smooth. In addition, the loss stroke from the closing of the return valve 29 until the opening of the supply valve 12 can be designed freely.

In addition, no high-accuracy machining as in the case of a spool valve is required, and the apparatus can be produced at low cost and excels in liquid-tightness at the time of seating of the supply valve 12, thereby preventing leakage of the liquid.

What is claimed is:

1. A hydraulic booster having a power piston slidably inserted into a cylinder member and coupled to a master piston of a master cylinder, a pressure chamber disposed in the rear of said power piston, a return valve provided in such a manner as to open and close a low-pressure channel connecting said pressure chamber to a reservoir, and a supply valve provided in such a manner as to open and close a high-pressure channel connecting said pressure chamber to a high-pressure fluid source, a high-pressure fluid being introduced into said pressure chamber as said return valve is closed and said supply valve is opened, said hydraulic booster comprising:

a valve sleeve slidably inserted in said power piston and urged rearwardly of said power piston by a first spring; and a cam portion provided on said valve sleeve and adapted to open said high-pressure channel by pressing said supply valve when said valve sleeve is advanced, wherein said supply valve is constituted by a first ball urged by a second spring in such a manner as to close said high-pressure channel, said cam portion is provided in an outer periphery of said valve sleeve, and said high-pressure channel consists of a gap between said power piston and said outer periphery of said valve sleeve.

2. A hydraulic booster according to claim 1, wherein said high-pressure channel is disposed in the radial direction of said power piston, a second ball being interposed between said supply valve and said cam portion, and said high-pressure channel being opened as said supply valve is pressed by said cam portion via said ball when said valve sleeve 25 advances.

3. A hydraulic booster according to claim 1, wherein said low pressure channel is disposed in the axial direction of said power piston, and said return valve is supported by a tip of said valve sleeve.

4. A hydraulic booster according to claim 1, wherein a stopper is installed on a rear surface of said valve sleeve facing said pressure chamber, and is pressed by a stopper receiving member provided on said power piston, the sliding range of said valve sleeve being restricted by said stopper and said stopper receiving member.

5. A hydraulic booster according to claim 1, wherein a recessed portion is formed at a tip portion of said power piston, and said piston of said master cylinder is connected to said recessed portion.

6. A hydraulic booster according to claim 5, wherein said master piston has a passage, and said low pressure channel is connected to said reservoir via said passage.

7. A hydraulic booster according to claim 6, wherein a check valve is provided in said passage of said master piston.

8. A hydraulic booster according to claim 1, wherein gaps are provided respectively between said power piston and said valve sleeve and between said cylinder member and said power piston, and said high-pressure channel is adapted to connect said pressure chamber to said high-pressure fluid source via said gaps.

9. A hydraulic booster according to claim 1, wherein said second spring for urging said supply valve in such a manner as to close said high-pressure channel has an annular shape and surrounds an outer periphery of the power piston.

10. A hydraulic booster according to claim 1, wherein said master piston is engaged with said power piston via a piston receiving member, and said low pressure channel is provided in said piston receiving member.

11. A hydraulic booster according to claim 10, wherein said piston receiving member is urged rearwardly by a third spring.

12. A hydraulic booster according to claim 1, herein a retaining cylinder for retaining said return valve is formed separately from said valve sleeve.

* * * * *